United States Patent
Radko

[19]
[11] Patent Number: 6,047,307
[45] Date of Patent: Apr. 4, 2000

[54] PROVIDING APPLICATION PROGRAMS WITH UNMEDIATED ACCESS TO A CONTESTED HARDWARE RESOURCE

[75] Inventor: Ronald O. Radko, Bellevue, Wash.

[73] Assignee: Microsoft Corporation, Redmond, Wash.

[21] Appl. No.: 08/812,437

[22] Filed: Mar. 7, 1997

Related U.S. Application Data

[62] Division of application No. 08/369,591, Dec. 13, 1994.

[51] Int. Cl.$^7$ ....................................... G06F 9/00
[52] U.S. Cl. ........................................ 709/100; 709/104
[58] Field of Search ................................... 709/100, 101, 709/301, 104, 102

[56] References Cited

U.S. PATENT DOCUMENTS

| | | | |
|---|---|---|---|
| 4,896,266 | 1/1990 | Klashka et al. ........................... | 710/45 |
| 5,535,416 | 7/1996 | Feeney et al. ............................ | 710/14 |

*Primary Examiner*—Majid A. Banankhah
*Attorney, Agent, or Firm*—Jones & Askew, LLP

[57] ABSTRACT

A system and method are disclosed for executing, in a multitasking operating system, an application program that accesses a protected resource directly without mediation by the operating system. For example, the application can be a backup application and the resource can be a floppy disk drive, QIC tape drive, or other storage device. The method of the invention can be executed in a computer system having a processor, a storage device, and a device control mechanism for controlling operations of the storage device responsively to commands issued by the processor. The device control mechanism can be, for example, a floppy disk controller chip if the storage device is, for example, a floppy disk drive. According to the invention, the processor executes the application program as a task of the operating system. The operating system includes a software component, such as a device driver, for issuing commands to the device control mechanism. The application program has its own component for issuing commands to the device control mechanism. While the application program is executing, the operating system's command-issuing component is temporarily bypassed, and the application program's command-issuing component is used to issue a command to the device control mechanism, which controls an operation of the storage device responsively to the issued command.

28 Claims, 11 Drawing Sheets

PROVIDING APPLICATION PROGRAMS WITH UNMEDIATED ACCESS TO A CONTESTED HARDWARE RESOURCE

CROSS-REFERENCE TO RELATED APPLICATION

This application is a divisional of U.S. patent application Ser. No. 08/369,591, filed Dec. 13, 1994.

TECHNICAL FIELD

The present invention relates to computer systems and more particularly to the control of protected resources, such as storage devices and other peripheral devices, in a computer system having a multitasking operating system.

BACKGROUND OF THE INVENTION

Computer operating systems can be classified as either single-tasking or multitasking. A single-tasking operating system provides a computing environment in which the computer's processor (CPU) can execute a single application program at a time. A multitasking operating system provides an environment in which the processor can execute a number of different application programs at the same time, more or less independently of one another.

With a multitasking operating system, two or more application programs executing simultaneously can contend for simultaneous access to the same protected resource. For example, in a personal computer, two applications executing under a multitasking operating system can both attempt to read from or write to a data storage device such as a floppy disk at the same time. The multitasking operating system resolves access conflicts in a manner that facilitates proper execution of all application programs while maintaining the integrity of the resource and its data. Known operating systems do this by mediating access of the application programs to the resource.

In particular, an operating system can require that any access by an application program to the resource be made through a call or trap to a special operating system routine called a device driver. Any attempt by the application to access the resource directly without going through the device driver results in an exception. For example, access to the resource can involve execution by the CPU of a privileged machine instruction. Only the operating system has the privilege necessary to execute this instruction, and any attempt by an application to execute the privileged instruction generates an exception. The exception causes control to be transferred back to the operating system, which prevents the application from directly accessing the resource.

Commonly, a personal computer can run any one of several different operating systems, including both single-tasking and multitasking operating systems. When a user decides to upgrade his or her computer by switching from a single-tasking to a multitasking operating system, the user faces a problem in that certain application programs adapted to the single-tasking operating system may not work properly under the multitasking operating system. Particularly troublesome are certain application programs designed to access protected resources directly, without using the operating system's device drivers.

Programs that access storage devices directly can do so for a number of reasons, such as execution speed and efficiency. Direct access affords faster overall data transfer to and from the storage device than is possible with mediated access. Thus direct access is used typically for application programs that must transfer large quantities of data rapidly. Such application programs can include, for example, backup utility programs, which can be used to make backup copies of files and other data from a hard disk or other on-line persistent storage to a floppy disk or other off-line storage medium.

In the single-tasking environment, direct access of a protected resource by an application program poses no resource contention problem, inasmuch as only one application program executes at a time. However, in the multitasking environment, the operating system needs to maintain control of the resource. Thus the user must abandon his or her existing application program, and must obtain a new program to perform the same task. This results in inconvenience and expense to the user. The user must not only pay the purchase price of the new program, but must spend valuable time learning how to use it and possibly teaching others, such as employees, how to use it.

Certain known multitasking operating systems, such as the Windows™ NT operating system by Microsoft, Corp. (Redmond, Wash.), attempt to support backup and other application programs that attempt to access protected resources directly, but without actually letting the applications perform direct access. An operating system of this kind can, for example, trap a backup application's attempts to perform direct access and in their place substitute calls to the corresponding device drivers of the operating system. Unfortunately, this substitution approach interferes with the application's proper functioning. Typically, the backup application's direct access code is time-critical, having been tuned for optimum data transfer performance. By substituting a device driver call for direct access, the operating system incurs extra time and processing overhead. In short, the substitution approach can cause data to be improperly transferred, and defeats the very purpose for having direct access in the first place.

SUMMARY OF THE INVENTION

The invention provides a system and method for executing an application program that accesses a protected resource directly (that is, without mediation by an operating system component such as a device driver) as a task of a multitasking operating system. For example, the application can be a backup application and the protected resource can be a floppy disk drive or other storage device. According to the invention, the operating system dynamically cedes control of the resource to the application program and later regains control of the resource, in a manner that facilitates the preservation of resource integrity. Further, the invention also can be used to allow an application program to control a peripheral device or other resource for which the multitasking operating system lacks a driver routine, such as a so-called QIC ("quick") tape drive in operating systems that ordinarily do not support such a tape drive.

In one aspect, the invention provides a method executed in a computer system having a processor, a storage device, and a device control mechanism for controlling operations of the storage device responsively to commands issued by the processor. The device control mechanism can be, for example, a floppy disk controller chip if the storage device is, for example, a floppy disk drive. According to the invention, the processor executes an application program as a task of a multitasking operating system. The operating system includes a software component, such as a device driver, for issuing commands to the device control mechanism. The application program has its own component for issuing commands to the device control mechanism. While the application program is executing, the operating system's command-issuing component is temporarily bypassed, and the application program's command-issuing component is used to issue a command to the device control mechanism, which controls an operation of the storage device responsively to the issued command.

The invention will be better understood with reference to the drawings and detailed description below. In the drawings, like reference numerals indicate like components.

DETAILED DESCRIPTION

Overview

Figure 1:
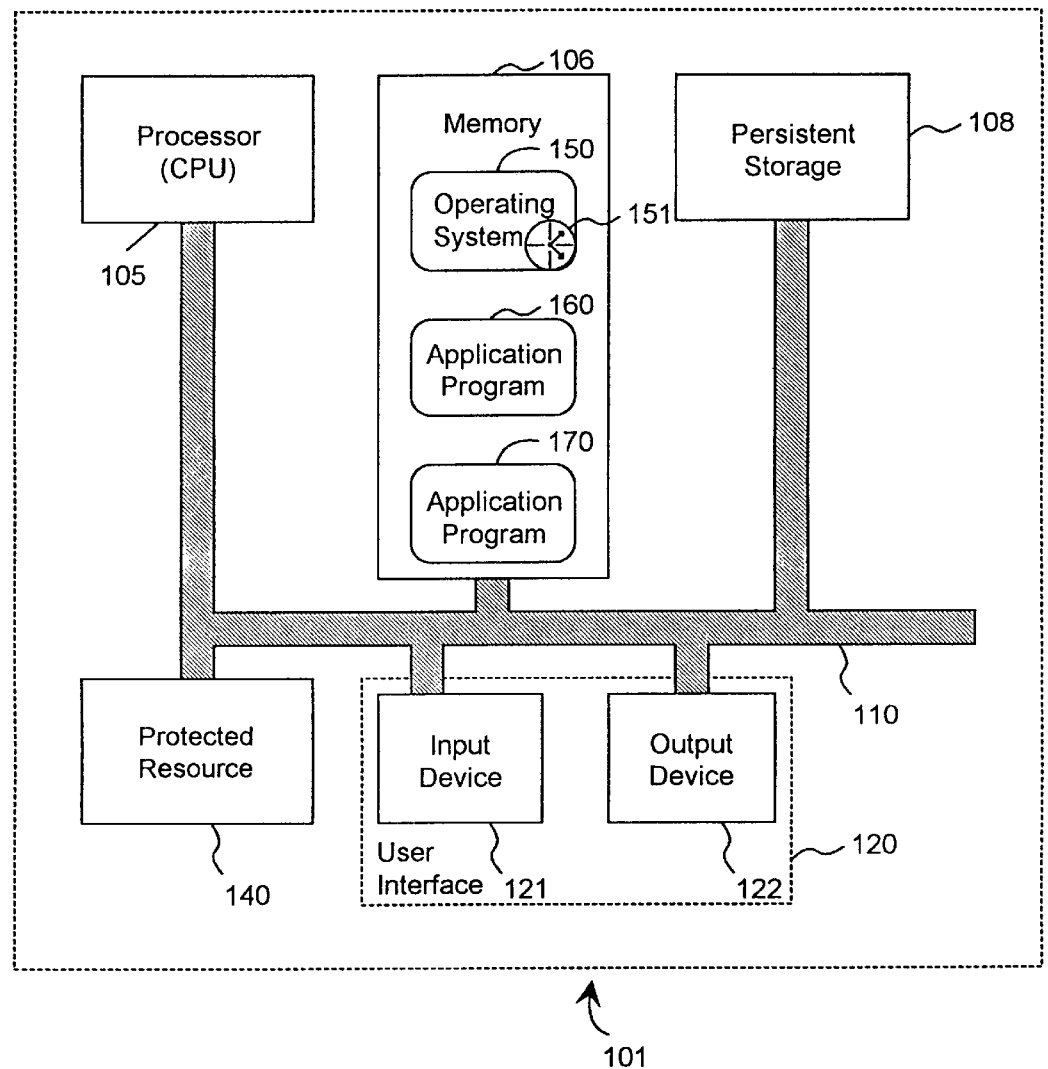
FIG. 1 illustrates the hardware and software of a computer system that includes a protected resource.

The invention provides a method and system in which an application program can access a protected resource directly, without mediation by an operating system device driver, in the context of a multitasking operating system that ordinarily bars such direct access. For example, the application can be a backup application for transferring data between a hard disk and a storage device such as a floppy disk drive or QIC tape. The invention makes it possible for legacy application programs originally designed to be run in a single-tasking operating system, such as Microsoft® MS/DOS™, to be run successfully in a multitasking operating system, such as Microsoft® Windows™ 95.

A basic principle of the system and method of the invention is to dynamically cede control of a protected resource, such as a floppy disk drive or QIC tape drive, from the operating system to a backup or other application program. This principle runs contrary to conventional wisdom, which teaches that an operating system must never give up control of a protected resource to an application program, lest the application wreak havoc on the resource and on the system at large. The invention makes the temporary shift of control both possible and workable by two expedients: (1) the routine (herein called a VXD) that accomplishes the shift of control is provided by the operating system itself, not by the application, thus minimizing the opportunity for mischief; (2) the operating system preferably resets the protected resource to a known state each and every time that an application program completes a direct access of the resource, thus ensuring that further use of the resource will proceed from a well-defined starting point.

In a specific embodiment to be described, the invention is implemented in the context of the Microsoft® Windows™ 95 operating system for IBM PC and compatible computers having or emulating Intel 80386, 80486, or Pentium™ processors. (It will be appreciated that the invention is also adaptable to other computers and operating systems.) Windows™ 95 supports the use of VXDs to accomplish on behalf of application programs certain operations ordinarily reserved to the operating system. More specifically, the listed Intel processors support privileged machine instructions that can be executed only at a high level of privilege. The Windows™ 95 operating system can execute at this high level of privilege whereas application programs execute at a lower level. A backup application, for example, ordinarily cannot execute a machine instruction that directly sends a command to the controller chip hardware that links the processor with the floppy disk drive mechanism. However, according to the invention the backup application program can cause the operating system to execute or emulate the privileged machine instruction on its behalf or, in some cases, can cause the operating system to enable the backup application program for a limited time to execute the instruction itself More specifically, the application program's attempt to execute the privileged machine instruction can automatically trigger a specially constructed VXD provided by the operating system. The VXD establishes exclusive access to the floppy disk drive for the application program and effectively or literally allows the application to carry out the privileged instructions.

System Hardware and Software

FIG. 1 provides an overview of the hardware and software of the system of the invention in a specific embodiment. The hardware of computer system 101 includes a processor (CPU) 105, coupled by a bus or other interface 110 to a memory 106, a persistent storage mechanism 108, a user interface 120 including an input device 121 and an output device 122, and a protected resource 140. System 101 can also include additional peripheral devices (not shown) coupled to processor 105 by bus or interface 110. Further, system 101 includes low-level interface components (not shown) that are logically situated between protected resource 140 and the combination of processor 105 and memory 106, as will be described more fully below in connection with FIG. 2.

Continuing in FIG. 1, the software of system 101 includes an operating system 150 and one or more application programs 160, 170. The software of system 101 or portions thereof can be loaded into memory 106 and thereafter can be executed by processor 105 as is well known in the art. In particular, application programs 160 and 170 can be executed under the control of operating system 150. In the specific embodiment, operating system 150 is the Windows™ 95 operating system. Operating system 150 includes a timer 151 that operating system 150 can use to time events in system 101. For example, timer 151 can be used to determine the elapsed time after an exception occurs or a particular interrupt is received by processor 105.

Processor 105 can be, for example, a microprocessor, such as the 80386, 80486 or Pentium™ microprocessor, made by Intel Corp. (Santa Clara, Calif.). Memory 106 can include, for example, random-access memory (RAM), read-only memory (ROM), virtual memory, or any other working storage medium or media accessible by processor 105. Storage mechanism 108 can include a hard disk, an optical or magneto-optical disk, or any other persistent storage medium. Storage mechanism 108 can also be located remotely from processor 105, in which case interface 110 can include a network (not shown) that links storage mechanism 108 with processor 105. User interface 120 facilitates communications between a user and system 101, and in particular provides a mechanism for a user to initiate the execution of application programs 160 and 170 and to receive messages such as error messages generated by operating system 150 or application programs 160 and 170. Input device 121 can be, for example, an alphanumeric keyboard or a pointing device such as a mouse, a trackball, or the like. Output device 122 can be, for example, a visual display device such as a cathode-ray tube (CRT) or flat-panel display. Protected resource 140 can be, for example, a peripheral device, and more particularly can be, for example, a storage device such as a floppy disk drive or QIC tape drive. Persons of skill in the art will appreciate that a wide range of hardware configurations can support the system and method of the present invention in various embodiments.

Processor 105 is assumed to provide a mechanism or mechanisms through which operating system 150 can maintain control over application programs 160, 170. For example, processor 105 can have an instruction set that includes certain privileged machine instructions. (The Intel microprocessors mentioned above support such instructions.) Privileged instructions can be carried out only in the context of a program that can execute at a sufficiently high level of privilege, such as operating system 150. A program that executes at a lower level of privilege, such as application program 160 or 170, cannot execute privileged instructions, and any attempt by the application program to do so results in an exception that transfers control to operating system 150.

Figure 2:
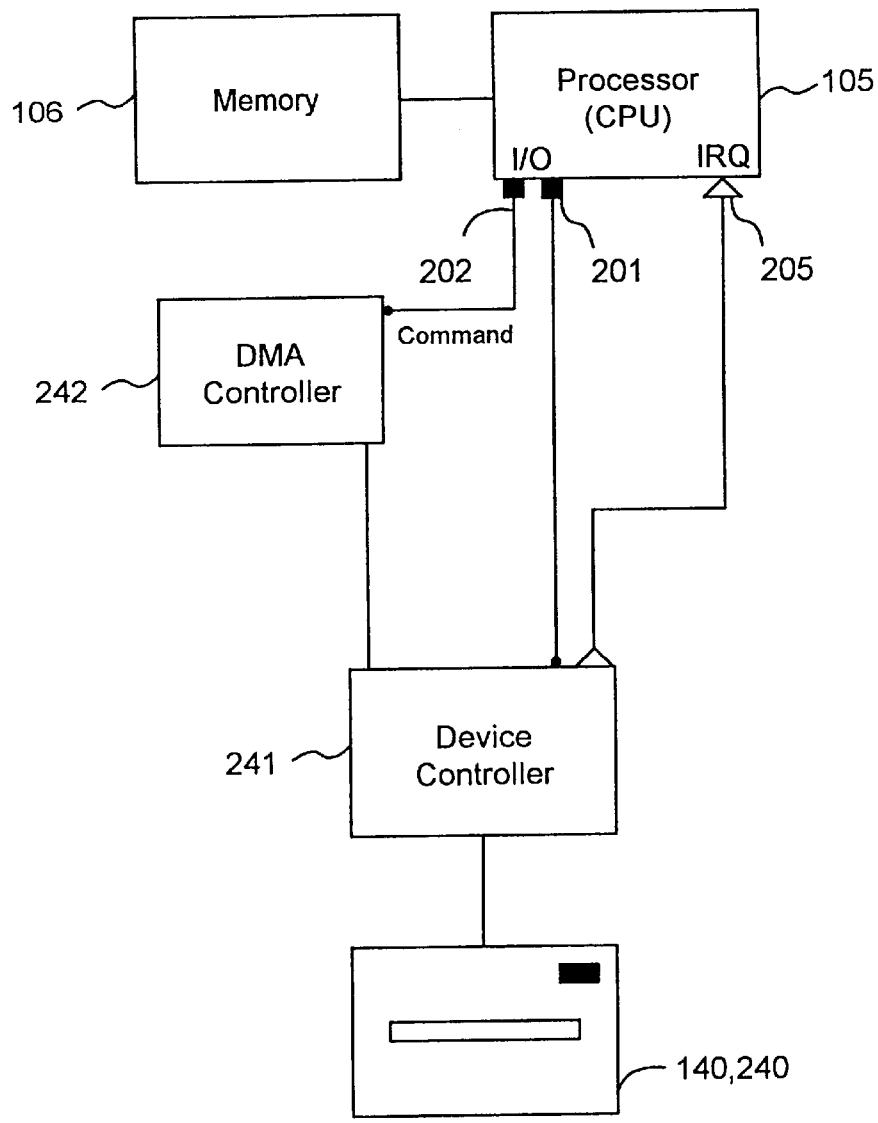
FIG. 2 shows the relationships among the processor, memory, floppy disk drive, device controller, and direct memory access (DMA) controller components of a computer system suitable to an embodiment of the invention.

System 101 includes certain interface components that are logically situated between protected resource 140 and the combination of processor 105 and memory 106, as is illustrated in FIG. 2. For concreteness of exposition, protected resource 140 is assumed in FIG. 2 to be a floppy disk drive 240. Floppy disk drive 240 can, for example, read from, write to, and seek a track or sector on a floppy disk (not shown), as is well known in the art. Floppy disk drive 240 communicates with processor 105 and memory 106 through interface components that include a device controller 241 and a direct memory access (DMA) controller 242.

Device controller 241 is used to control the operations of floppy disk drive 240. For example, device controller 241 can cause floppy disk drive 240 to seek a position on the floppy disk or to read data from or write data to the floppy disk. Device controller 241 responds to commands issued from processor 105 under software control via input/output (I/O) port 201, and can send an interrupt request (IRQ) signal to processor 105 via IRQ line 205, for example when a requested floppy disk drive operation completes. Device controller 241 can be implemented as an integrated circuit, for example the Intel 8272 floppy disk controller chip.

DMA controller 242 is used to facilitate data transfer between memory 106 and the floppy disk during read and write operations. It responds to commands issued from processor 105 under software control via I/O port 202, and is also coupled to memory 106 and device controller 241. Data can be transferred by DMA controller 242 from memory 106 through device controller 241 to floppy disk drive 240 and ultimately to the floppy disk, as well as in the reverse direction from the floppy disk to memory 106, as is well understood in the art. DMA controller 242 can be implemented using circuitry closely coupled to processor 105 and memory 106. It can, for example, be a single channel of a multiple-channel DMA controller that services both floppy disk drive 240 and other devices in system 101.

During the execution of a floppy disk backup application program, data to be transferred from a hard disk to a floppy disk is loaded into memory 106 from the hard disk of persistent storage 108 and then is written to a floppy disk by floppy disk drive 240. Processor 105 issues instructions to device controller 241 and DMA controller 242 via I/O ports 201 and 202, respectively, to bring about the transfer. Data moves from memory 106 via DMA controller 242 through device controller 241 to the write head of floppy disk drive 240 and onto the floppy disk.

Figure 3:
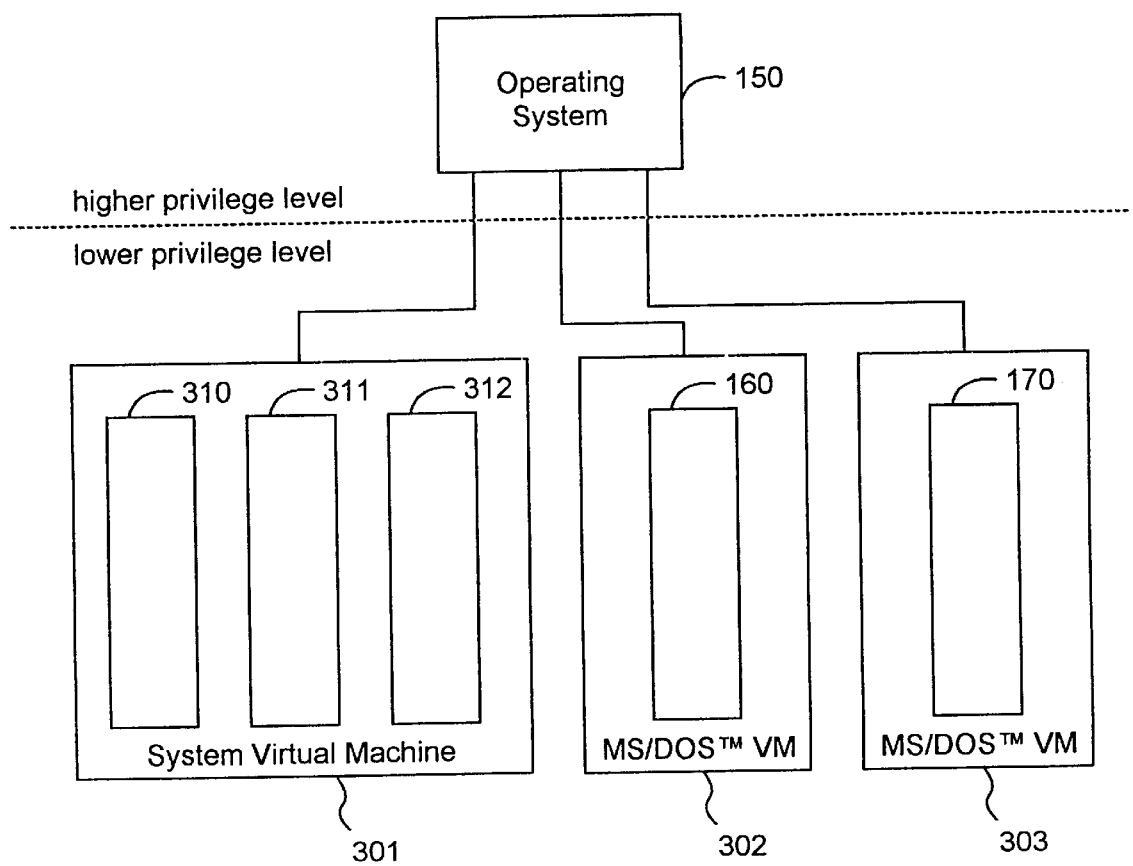
FIG. 3 is an example of the relationship between executing tasks and the operating system.

FIG. 3 shows an example of tasks executing in operating system 150. Application programs, including application programs 160 and 170 run as tasks of operating system 150. Because operating system 150 is assumed to be Microsoft® Windows™ 95 in this embodiment, a brief explanation will now be provided concerning the way in which Windows™ 95 structures its tasks so as to allow MS/DOST™ application programs to run under Windows™ 95 without modification.

For purposes of the invention, it is helpful to distinguish three kinds of application programs that Windows™ 95 can run: namely, application programs originally written for (that is, designed to be executed within) a single-tasking operating system such as MS/DOS™; application programs originally written for an earlier version of Microsoft® Windows™ such as Windows™ 3.1; and application programs specifically written for Windows™ 95. Whereas an application program of the second or third kind is designed to run in a multitasking environment in which system resources are shared, an application program of the first kind is designed to run in a single-tasking environment in which it has the entire system to itself To accommodate application programs of the first kind, Windows™ 95 executes each such application program as a separate task that runs in its own "virtual machine." Each virtual machine (VM emulates in software the facilities of an IBM PC-compatible computer running under MS/DOS™ so as to provide an operating environment equivalent to that for which the application program was originally designed. Application programs of the second and third kinds run together in a separate virtual machine called the "system virtual machine" that provides an environment suitable for the execution of these programs. The system VM maintains a number of separate tasks called threads, one for each of the applications that it is executing.

Returning now to FIG. 3, operating system 150 is shown running three virtual machines, namely a system VM 301, and two single-task VMs 360 and 370. System VM 301 includes several threads 310, 311, 312. Each of threads 310, 311, 312 within system VM 301 executes independently of the other threads, and can run a separate application program of the second or third kind. Single-task VMs 302 and 303 each run a single application program of the first kind. VM 302 is shown running application program 160, and VM 370 is shown running application program 170. Each of threads 310, 311, 312 and each of application programs 160, 170 can be considered a separate task of multitasking operating system 150.

As has already been mentioned, processor 105 supports privileged machine instructions. Operating system 150 can run at a high level of privilege and so is able to execute the privileged instructions. The tasks of operating system 150—specifically in FIG. 3, threads 310, 311, 312 and application programs 160, 170—run at a lower level of privilege, and so are not able to execute the privileged instructions for themselves. VXDs (not shown) provide a mechanism by which tasks, such as threads 310, 311, 312 and application programs 160, 170, can cause operating system 150 to execute privileged instructions on their behalf or, in some instances, can cause operating system 150 to grant them temporary privileges to execute the instructions themselves.

Another aspect of Windows™ 95 relevant to the specific embodiment of the invention is interrupt reflection. When processor 105 receives an interrupt, for example from IRQ line 205, operating system 150 determines whether to process the interrupt itself or to route it to a virtual machine. To facilitate this, operating system 150 maintains a set of interrupt descriptor tables (IDTs), one for itself and one for each VM. An IDT is a data structure that contains a collection of addresses that point to interrupt service routines to be used in a particular context.

Figure 4:
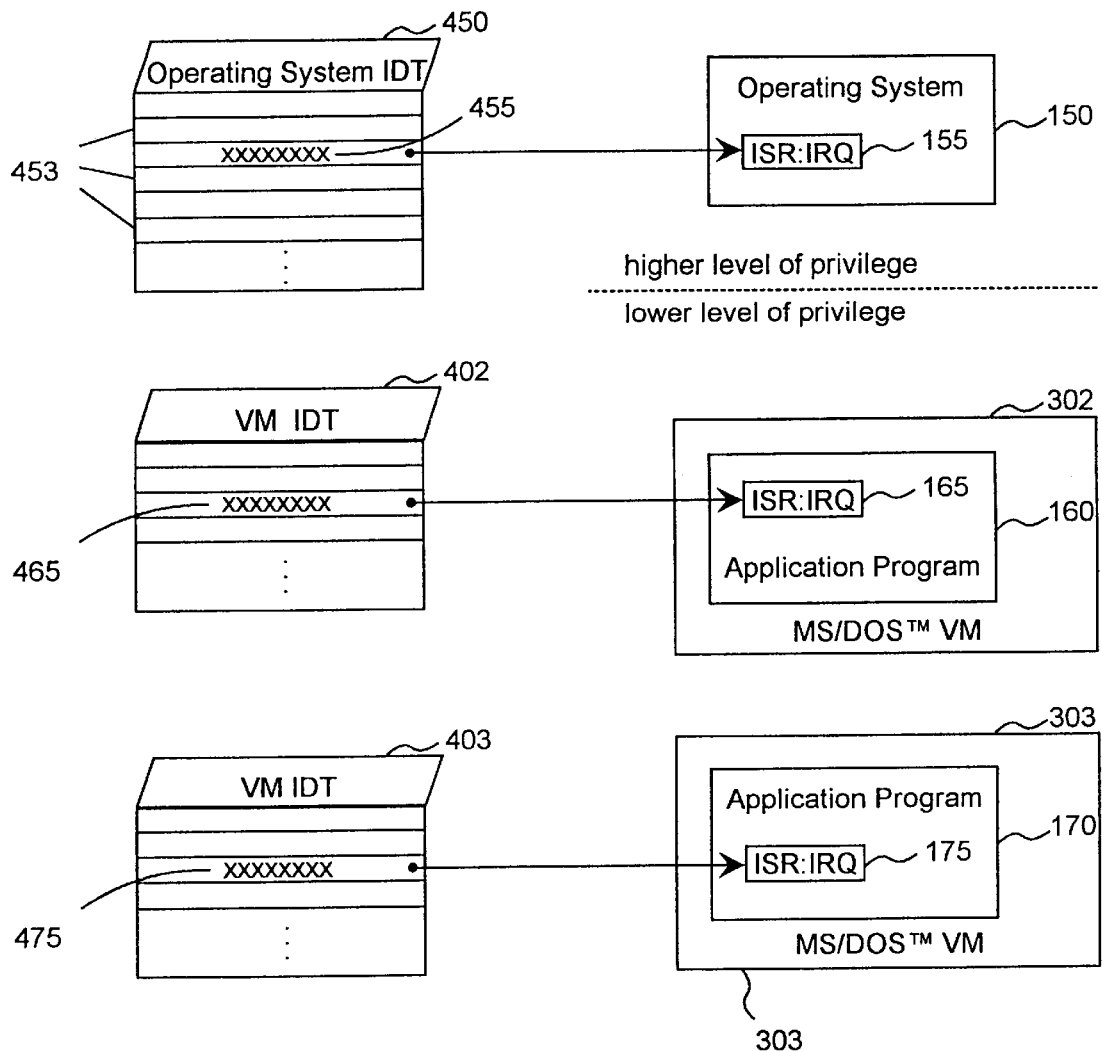
FIG. 4 is an example of interrupt descriptor tables used by the operating system for interrupt reflection.

FIG. 4 illustrates an example of IDTs. IDT 450 is the interrupt descriptor table that operating system 150 uses when processing interrupts itself IDT 450 contains a collection of addresses 453 that point to interrupt service routines for various interrupts that processor 105 can receive. Notably, IDT 450 contains an address 455 that points to an interrupt service routine 155 for the IRQ line 205 interrupt from device controller 241. Interrupt service routine 155 is included as part of the software of operating system 150. IDTs 402 and 403 are interrupt descriptor tables that operating system 150 uses when routing interrupts to virtual machines 302 and 303, respectively. Each WDT contains a collection of interrupt service routine addresses. In particular, IDT 460 contains an address 465 that points to an interrupt service routine 165 for interrupts received from device controller 241 via IRQ line 205. Interrupt service routine 165 can be part of application program 160. Similarly, IDT 470 contains an address 475 that points to an interrupt service routine 175 for interrupts from device controller 241 via IRQ line 205. Interrupt service routine 175 is part of application program 170. Operating system further maintains additional IDTs (not shown), including an IDT for the system VM which is shared among the threads of the system VM.

The process of routing a received interrupt from operating system 150 to a virtual machine is called reflecting the interrupt. When reflecting an interrupt to a virtual machine, operating system 150 emulates the effect or effects on an executing task of a hardware interrupt occurring in the virtual machine in which the task executes. A task of the first kind (that is, an application program originally written for a single-tasking environment) running in its own VM responds to the emulated interrupt as though it were running on its own dedicated computer in a single-tasking environment and had received a hardware interrupt. Similarly, a task of the second or third kind running as a thread in the System VM sees the equivalent of a hardware interrupt to the System VM.

As an example of interrupt reflection, if processor 105 receives an interrupt from device controller 241 via IRQ line 205 while application program 160 is executing, operating system 150 can reflect the interrupt to the virtual machine in which application program 160 is running (that is, to VM 302) for processing. To do so, operating system 150 issues an emulated interrupt to VM 302. Application program 160 responds to this emulated interrupt as though the original hardware interrupt had been transmitted directly to application program 160 without intervention by operating system 150. In particular, the interrupt is processed using interrupt service routine 165 provided by application program 160. Operating system 150 determines the correct interrupt service routine to use by retrieving the routine's address 461 from IDT 460.

It is up to operating system 150 whether and when to reflect an interrupt. Thus, although operating system 150 maintains an IDT for each VM, the VM's IDT need not be used when processing a given interrupt. An interrupt received in operating system 150 can give rise to zero, one, or several emulated interrupts.

Method Steps

Figure 5A:
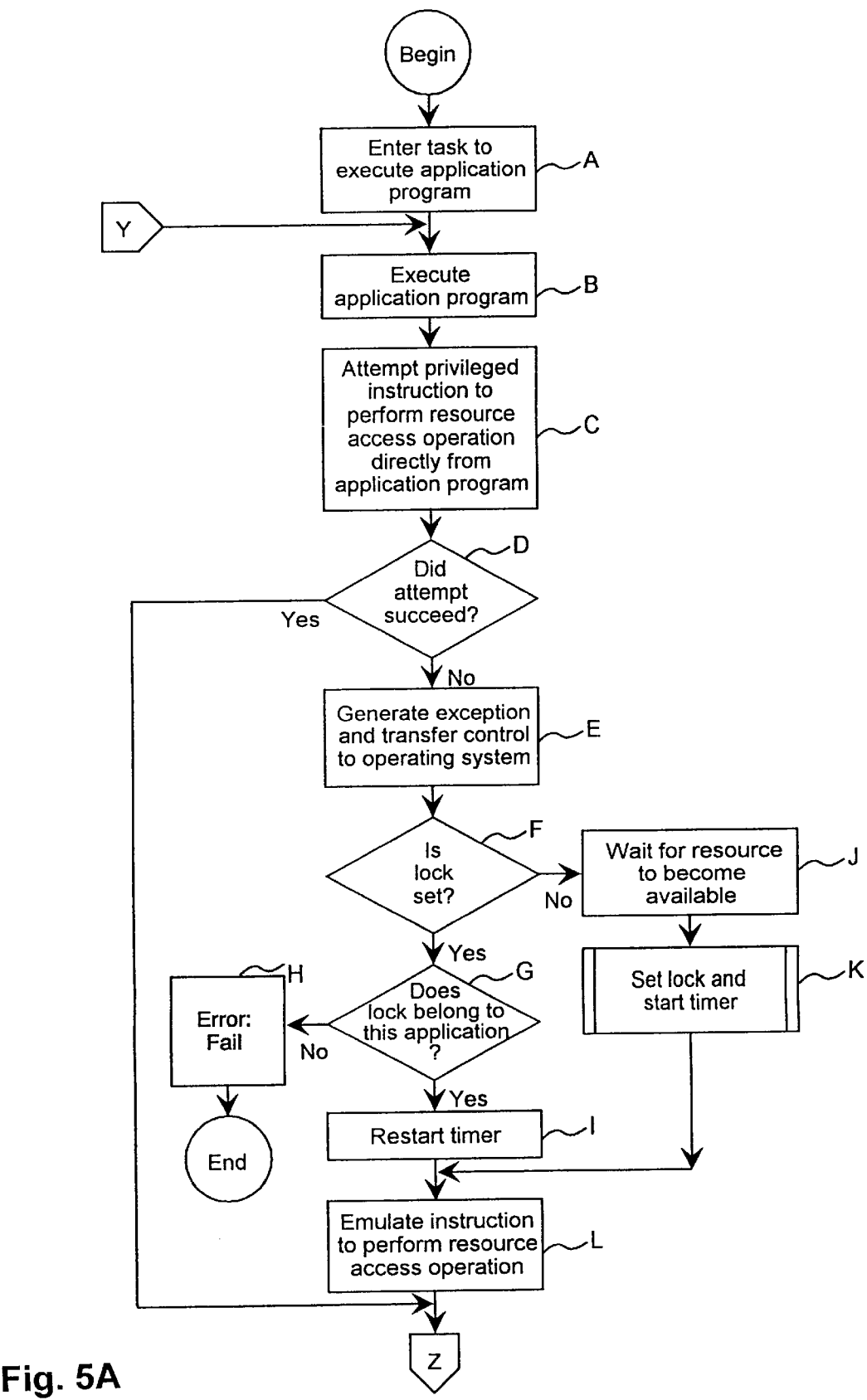
FIG. 5 is a high-level flowchart depicting the steps of the method of the invention for an application program designed to access a protected resource directly.
Figure 5B:
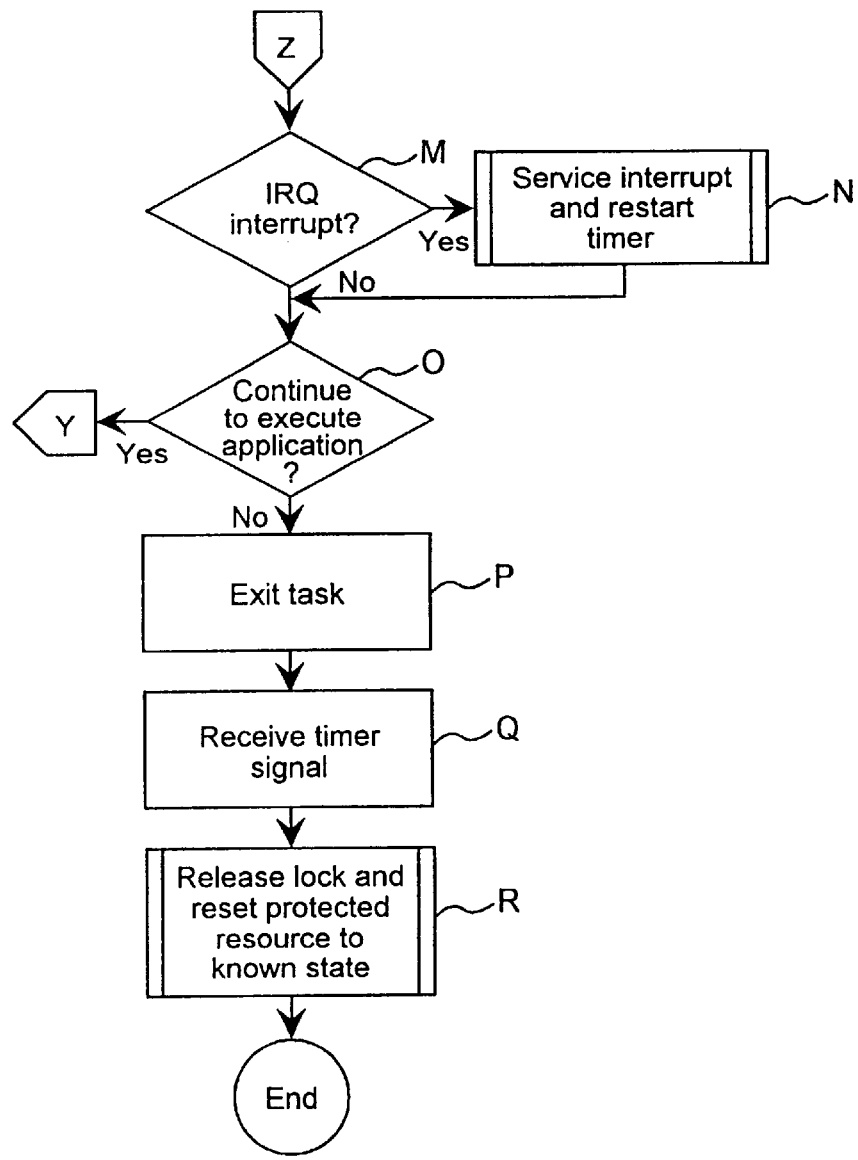

FIG. 5 shows the steps of the method of the invention in a specific embodiment. In FIG. 5, it is assumed that application program 160 is an application program originally designed for execution in the context of a single-tasking operating system that is now being executed in the context of multitasking operating system 150. It is further assumed that at the outset (prior to step A), application program 160 is running as a task of operating system 150. No assumption is made as to whether application program 160 is just starting or has been running for some time, so long as operating system 150 has established a task (and a virtual machine) to execute application program 160. Operating system 151) can, for example, establish a task to execute application program 160 responsively to a command received from the user via input device 121.

Operating system 150 switches into the established task (step A) and executes application program 160 (step B). Application program 160 continues until processor 105 attempts to execute a privileged instruction in order to perform an operation to access protected resource 140 protected resource 140 directly (step C). For example, if protected resource 140 is floppy disk drive 240 as shown in FIG. 2, application program 160 can attempt to execute a privileged machine instruction that accesses device controller 241 or DMA controller 242. More particularly, if processor 105 is an Intel 80386, 80486, or Pentium™ that accesses device controller 241 through I/O port 201 and accesses DMA controller 242 through I/O port 202, then the privileged instruction can be a port instruction of the form

| IN  | port#, xxx or |
|-----|---------------|
| OUT | port#, xxx    | where port# represents the numeric (hexadecimal) value of the port for device being accessed (that is, for device controller 241 or DMA controller 242), and xxx represents a value transferred upon execution of the port instruction.

As noted above, ordinarily application program 160 lacks sufficient privilege to execute the privileged machine instruction. However, in some cases, as described below, operating system 150 can grant application program 150 temporary privileges to execute certain privileged port instructions, in particular instructions to access device controller 241 (though preferably not instructions to access DMA controller 242). If application program 160 has such temporary privileges, the privileged port instruction succeeds (step D) and execution continues at step M. Otherwise, execution continues at step E.

When application program 160 lacks sufficient privilege to access protected resource 140 directly, processor 105 generates an exception and thereby transfers control to an appropriate exception handling or "trap" routine in operating system 150 (step E). In response to the exception, operating system 150 determines whether a lock is set on protected resource 140 (step F). The lock is used to indicate whether an application program has control of protected resource 140.

If the lock is set, operating system 150 determines whether the lock was set by application program 160 or by another task (step G). If the lock belongs to another task, an error occurs and operating system 150 fails the attempt by application program 160 to access protected resource 140 (step H). For example, operating system 150 can terminate application program 160, send an error message to the user via output device 122, or take any other appropriate action. If the lock was set by application program 160, operating system 150 restarts timer 151 (step I). Thereafter, execution proceeds at step L.

If the lock is not already set, operating system 150 waits for any ongoing use of protected resource 140 by another task to complete (step J), to ensure that application program 160 will have uncontested access to protected resource 160 when the lock is set. During the waiting period, operating system 150 reserves protected resource 140 for use by application program 160, so that no other task can gain access to protected resource 140 while application program 160 is waiting for it.

Once the resource becomes available, operating system 150 sets the lock and starts timer 151 (step K). The lock is set using a special VXD in the manner described more fully with reference to FIG. 6A below. The lock makes protected resource 140 available for direct access by application program 160, and prevents other tasks from accessing protected resource 140 while application program 160 is using it. As part of setting the lock, operating system 150 establishes interrupt reflection so that subsequent interrupts received by processor 205 from device controller 241 via IRQ line 205 will be reflected to the virtual machine in which application program 160 is running, so that they can be processed by application program 160's interrupt service routine. Also, operating system 150 grants application program 160 the aforementioned temporary privileges to execute certain privileged port instructions, so that subsequent attempts by application program 160 to execute privileged port instructions that access device controller 241 will succeed so long as the lock remains set. Subsequent attempts by application program 160 to execute privileged port instructions for DMA controller 242 will continue to be trapped by operating system 150. After setting the lock, execution continues at step L.

It is advantageous to grant application program 160 privileges to perform device controller operations but to continue to trap DMA operations in operating system 150. In many floppy disk backup application programs, DMA operations are less time-critical than device controller operations. Thus the additional overhead incurred in generating an exception and handling the exception in the operating system does not cause the application program to malfunction. Moreover, DMA operations can require the operating system to perform address-mapping or double-buffering in order to compensate for the fact that the application program executes in a virtual machine rather than in a physical machine. In particular, the IBM PC architecture limits the address space that is accessible to the DMA controller, yet the memory allocated to the application program by the multitasking operating system need not lie within these limits. The operating system can compensate by creating an intermediate buffer in a portion of memory accessible to the physical DMA hardware, and transferring data from the application program's memory space to the floppy disk via the intermediate buffer.

Continuing in FIG. 5, in step L operating system executes or emulates the privileged instruction that was attempted by application program 160 in step C. If the instruction is a port instruction to access device controller 241, operating system 150 simply executes the instruction. If the instruction is a port instruction to access DMA controller 242, operating system 150 performs any necessary address-mapping or double buffering in order to emulate the effect that the instruction would have had if application program 160 were running in the single-tasking environment for which it was designed. In response to the executed or emulated port instruction, the device accessed by the instruction (that is, device controller 241 or DMA controller 242) performs the requested operation: For example, device controller 241 can perform a read, write, seek, calibration, track formatting, or other floppy disk operation according to its hardware capabilities and the value transferred upon execution of the port instruction. DMA controller 242 can, in conjunction with device controller 241, facilitate a data transfer from memory 106 to the floppy disk or vice versa.

Device controller 241 issues an interrupt to processor 105 via IRQ line 205 upon completing certain operations. If an interrupt issues (step M), it is serviced and timer 151 restarted (step N) as described more fully below with reference to FIG. 6B. If no interrupt issues, execution continues at step O.

Persons of skill in the art will appreciate that in general, the issuance of the interrupt by device controller 241 and the subsequent servicing of the interrupt by operating system 150 occur asynchronously with respect to task execution and, in particular, with respect to the execution of application program 160. Thus, although steps M and N logically follow step L, they need not immediately follow step L in time. An instruction to access device controller 241 can, for example, lead to an IRQ interrupt that issues at a later point in the execution of application program 160 (that is, during a subsequent occurrence of step B) or at a time when operating system 150 is executing a task other than application program 160. A DMA data transfer can involve a sequence of port instructions issued variously to device controller 241 and DMA controller 242. Although DMA controller 242 lacks a direct connection to IRQ line 205, so that port instructions issued to DMA controller 242 do not in and of themselves result in the issuance of an interrupt, nevertheless the completion of a DMA data transfer causes device controller 241 to issue an interrupt via IRQ line 205.

After the privileged instruction has been performed, application program 160 can continue to execute or can be switched out by operating system 150 (step O). If application program 160 continues to execute, execution proceeds at step B. Otherwise, operating system 150 switches to another task or, if application program 150 has completed its execution, terminates its task (and virtual machine) and can then switch to another task (step P).

Meanwhile, timer 151 has been started (in step K) and possibly restarted (in step I or step N) and is measuring the time elapsed since it was last started or restarted. Timer 151 can, for example, decrement a counter at each tick of a system clock. When the elapsed time exceeds a predetermined value such as thirty (30) seconds, timer 151 issues a signal that is received by operating system 150 (step Q). In response, operating system 150 releases the lock and resets protected resource 140 to a known state (step R), as more fully described with reference to FIG. 6C below.

As with the interrupt signal from IRQ line 205, persons of skill in the art will appreciate that the signal from timer 151 occurs asynchronously with respect to execution of application program 160. It is possible, for example, that the time-out signal can arrive while application program 160 is executing. As a practical matter, however, the predetermined time-out interval is set to a sufficiently long value that a backup application program is likely to have completed its backup operation well before timer 151 expires. For example, a DMA transfer in a floppy disk backup program is commonly on the order of 0.25 seconds long. A predetermined time-out value (such as 30 seconds) that exceeds the DMA transfer time by an order of magnitude or more, in conjunction with the frequent restarting of the timer when application program 160 performs multiple resource access operations, practically ensures that timer 151 will expire only after the last device access operation has been performed by application program 160 and application program 160 has completed its backup operation (and, possibly, finished executing altogether).

Commonly, application program 160 performs a sequence of resource access operations rather than a single operation, because the operations of which device controller 241 is capable are relatively simple. To backup a file to a floppy disk, for example, application program 160 must carry out a large number of privileged instructions. Once the lock is set, application program 160 has control of protected resource 140 (that is, of floppy disk 240 in this embodiment), and the lock remains set until timer 151 expires. Inasmuch as timer 151 is reset at the beginning of each DMA transfer and after every interrupt from device controller 241, there is little chance of the lock's being released while application program 160 is still using protected resource 140.

Figure 6A:
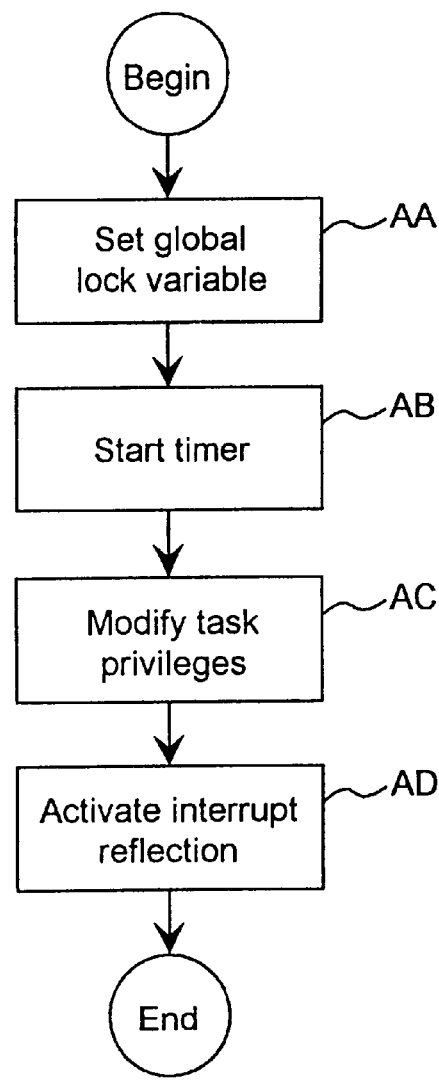
FIGS. 6A–6C are more detailed flowcharts of the steps for setting the lock, processing interrupts from the device controller, and releasing the lock.
Figure 6B:
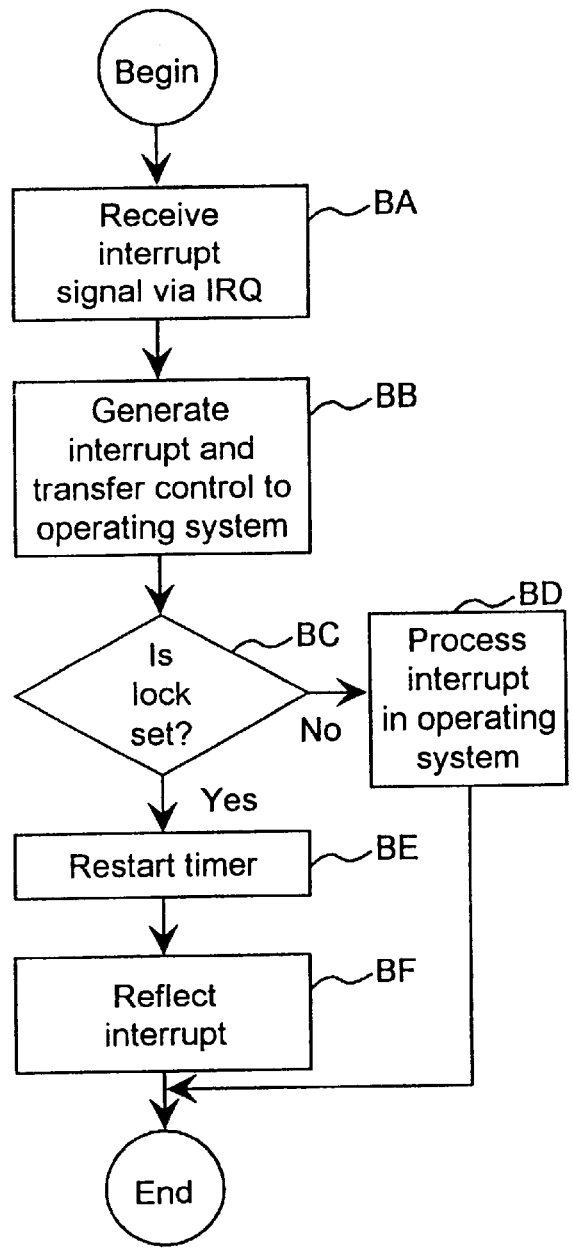
Figure 6C:
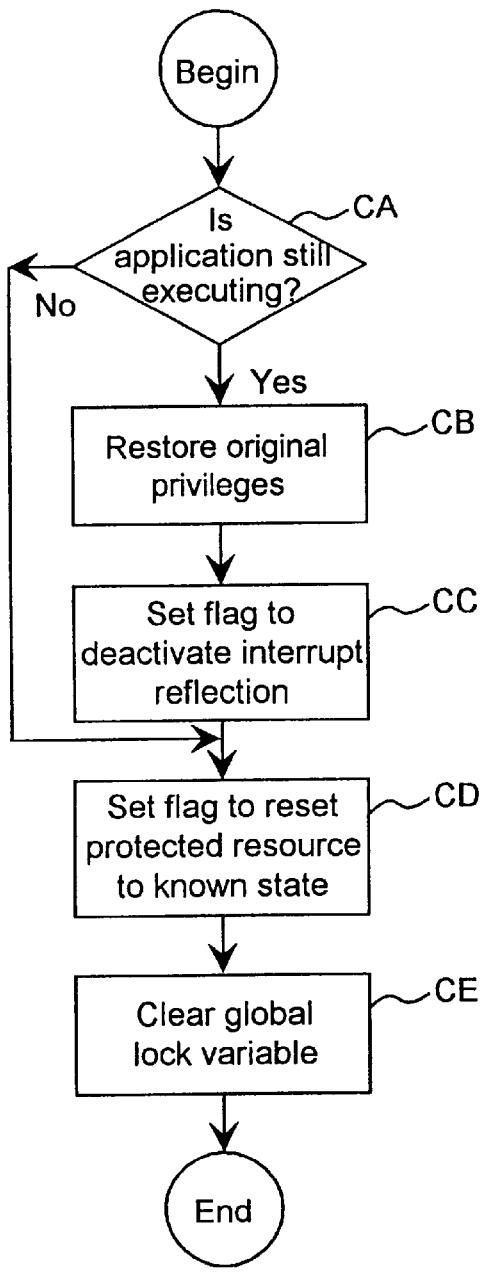

FIGS. 6A–6C illustrate details of certain steps of FIG. 5 for the specific embodiment. FIG. 6A is a more detailed flowchart of the component steps of step K; FIG. 6B, of step N; and FIG. 6C, of step R.

Referring to FIG. 6A, operating system 150 sets the lock by invoking a special VXD (referred to hereinafter as VFBackup) that is provided as a component of the software of operating system 150. To set the lock, VFBackup sets the value of a global variable or flag accessible to operating system 150 (step AA) and starts timer 151 (step AB). For example, VFBackup can preset timer 151 to a predetermined value, such as 30 seconds, and cause it to begin counting down so as to measure elapsed time. Further, VFBackup modifies the task privileges of application program 160 so that subsequent attempts by application program to execute privileged instructions to access device controller 241 (though preferably not DMA controller 242) will succeed so long as the lock remains set. VFBackup also takes any actions necessary to ensure correct processing of this attempt and subsequent attempts by application program 160 to access protected resource 140 directly. In particular, VFBackup arranges for interrupts received from device controller 241 via IRQ line 205 while the lock is set to be reflected to application program 160 (step AD).

VFBackup is a VXD. Application program 160 needs to invoke this VXD (and more precisely, needs to invoke a service called VFBackup_Exclusive_Access, which is part of VFBackup) in order to cause operating system 150 to execute or emulate privileged port instructions on its behalf and to obtain temporary privileges from operating system 150 to execute certain privileged port instructions pertaining to device controller 241. However, application program 160, having been written for a single-tasking environment in which VXDs do not exist, has no way to invoke the VXD directly. The invention resolves this problem by treating the application's first attempt to execute a privileged pore instruction as the equivalent of a call to VFBackup. Thus, whenever the lock has not yet been set and protected resource 140 is available, operating system 150 treats application program 160's initial direct access attempt (in step C of FIG. 5) essentially as though application program 160 had simply invoked VFBackup itself.

Referring to FIG. 6B, when processor 105 receives an interrupt from device controller 241 via IRQ line 205 (step BA), an interrupt is generated and control transfers to operating system 150 (step BB). Processing of the interrupt depends on whether the lock is set (step BC). If the lock is not set, operating system 150 processes the interrupt using its own interrupt service routine (step BD). If the lock is set, timer 151 is restarted (step BE) and the interrupt is reflected to the virtual machine in which application program 160 is executing (step BF). The interrupt is then processed using the interrupt service routine whose address is stored in the EDT for the application. For example, if (as in FIG. 4) application program 160 is running in VM 302, then if the lock is set the interrupt is processed using interrupt service routine 165 whose address 465 is stored in IDT 402. If the lock is not set, the interrupt is processed using interrupt service routine 155 whose address 455 is stored in IDT 450.

Referring to FIG. 6C, upon receiving the time-out signal from timer 151, operating system 150 invokes VFBackup (and more precisely, a service of VFBackup called VFBackup_Global_Access) to release the lock. If application program 160 is no longer running (step CA), control transfers to step CD. If application program 160 is still running, VFBackup restores its original task privileges so that subsequent attempts by application program 160 to execute privileged port instructions will fail (Step CB). Also, a flag is set to cause interrupt reflection to be deactivated the next time protected resource 140 is accessed (step CC). Deactivating interrupt reflection causes interrupts received by processor 105 from device controller 241 via IRQ line 205 to be handled by the operating system's own interrupt service routine rather than by application program 160. Whether or not application program 160 is still running, VFBackup sets a flag to cause protected resource 140 to be reset to a known state the next time it is accessed (step CD) and clears the global variable that indicates the lock status (step CE). This releases protected resource 140 so that other VMs can access it.

VFBackup causes protected resource 140 (floppy disk drive 240 in this embodiment) to be reset to a known state because during the backup or other operations performed by application program 160, operating system 150 does not keep track of what application program 160 is doing. Thus application program 160 can leave floppy disk drive 240 or device controller 241 in an arbitrary and unknown state. For example, application program 160 can leave the floppy disk read/write head positioned at an unknown sector and track of the disk, or even leave the floppy disk drive empty. Operating system must ensure that subsequent access to floppy disk drive 240 proceeds from a known state, and must prevent inconsistency between the state of floppy disk drive 240 and the internal states of any pending computations involving the use of floppy disk drive 240. According to the invention, in a preferred embodiment operating system 150 performs a full and complete reset with device controller 241, thereby bringing device controller 241, floppy disk drive 240, and the floppy disk itself from unknown into known states.

The flags set in steps CC and CD serve to postpone the deactivation of interrupt reflection and the resetting of protected resource 140 to a known state until the next time that protected resource 140 is accessed. That is, rather than deactivating interrupt reflection and resetting the resource immediately when timer 151 expires, operating system 150 gives application program 160 a last chance to recover control of protected resource 140 (floppy disk drive 240 in this embodiment), and in particular to service any interrupts from device controller 241 that happen to be received after timer 151 expires.

Figure 7:
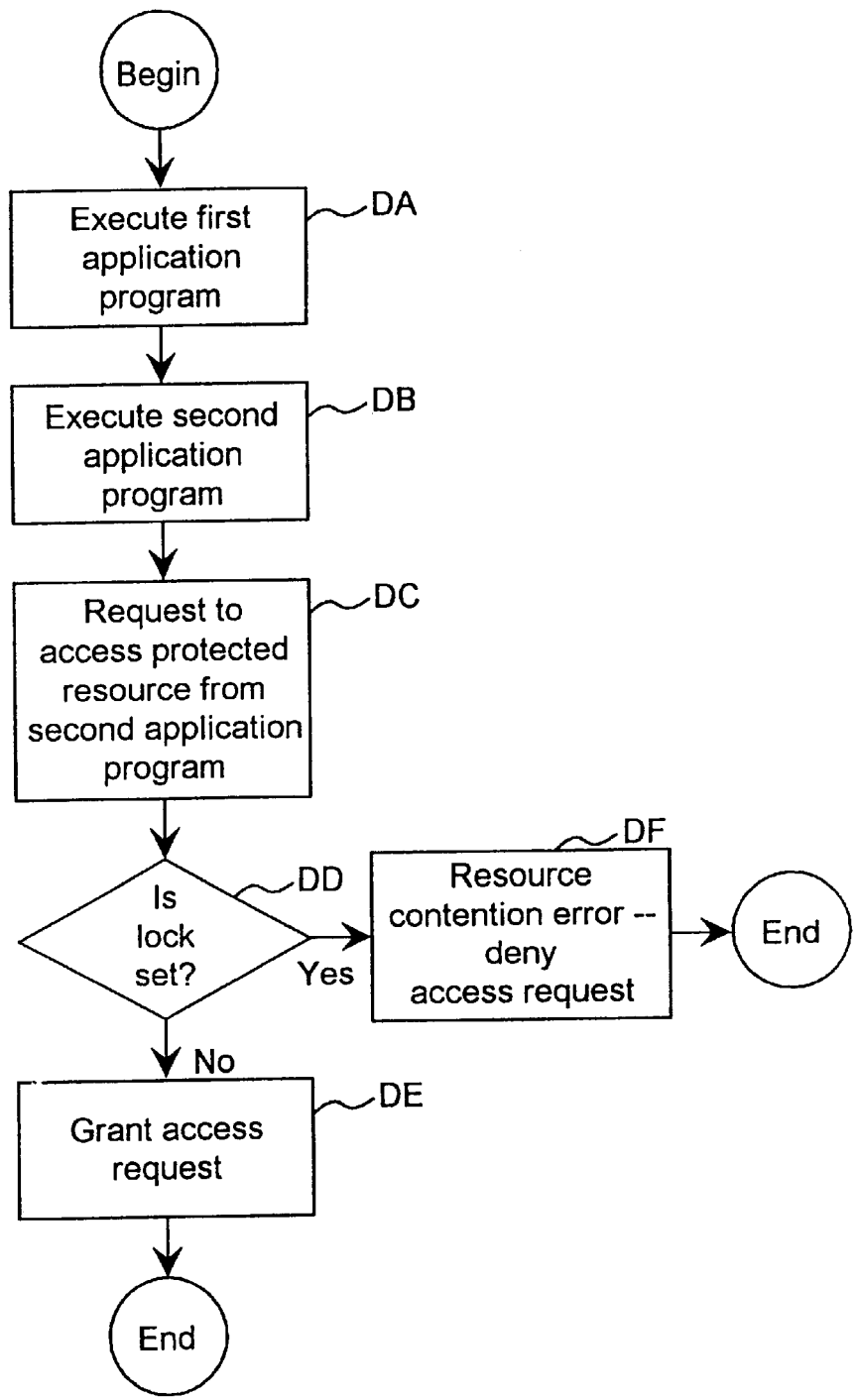
FIG. 7 is a flowchart of steps for device contention resolution.

The invention facilitates unimpeded access to the device controller by application program 160. FIG. 7 is a flowchart of the logic by which operating system 150 resolves contention for protected resource 140 in favor of application program 160 when the lock is set. Contention can occur when a second application program issues a request to access protected resource 140 at the same time as application program 160 is accessing the resource. For example, if protected resource 140 is floppy disk drive 240, application program 160 is a backup application, and the second application program is a word processing application, then an inadvertent attempt to read a word processing data file from a floppy disk into the word processing program while backing up another file to the same floppy disk gives rise to contention between application programs 160 and the word processing program for floppy disk drive 240.

In FIG. 7, the first application program is an application program of the first type, that is, an application program written for a single-tasking environment. The second application program, which contends with the first application program for access to the protected resource, can be an application program of the first, second, or third type, and can be attempting either to access the resource directly by attempting to execute a privileged port instruction, or to access the resource through a device driver or other routine of operating system 150. Operating system 150 executes the first application program (step DA) and the second application program (step DB) as tasks. The second application program requests or attempts to access protected resource 140 (step DC). If the lock is not set (step DD), operating system 150 grants the second application program access to the resource (step DE). However, if the first application program has previously succeeded in an attempt to access the resource directly and has thereby caused the lock to be set, a resource contention error occurs and the second application program is denied access to the resource (step DF).

Certain application programs access protected resource 140 using a combination of direct and mediated access. For example, a backup application program written for MS/DOS™ can use a combination of privileged port instructions and calls or traps to MS/DOS™ device drivers, which Widows™ 95 intercepts and converts into appropriate Windows™ 95 device driver calls. The invention can accommodate this hybrid access, as will now be shown for the specific embodiment.

Figure 8:
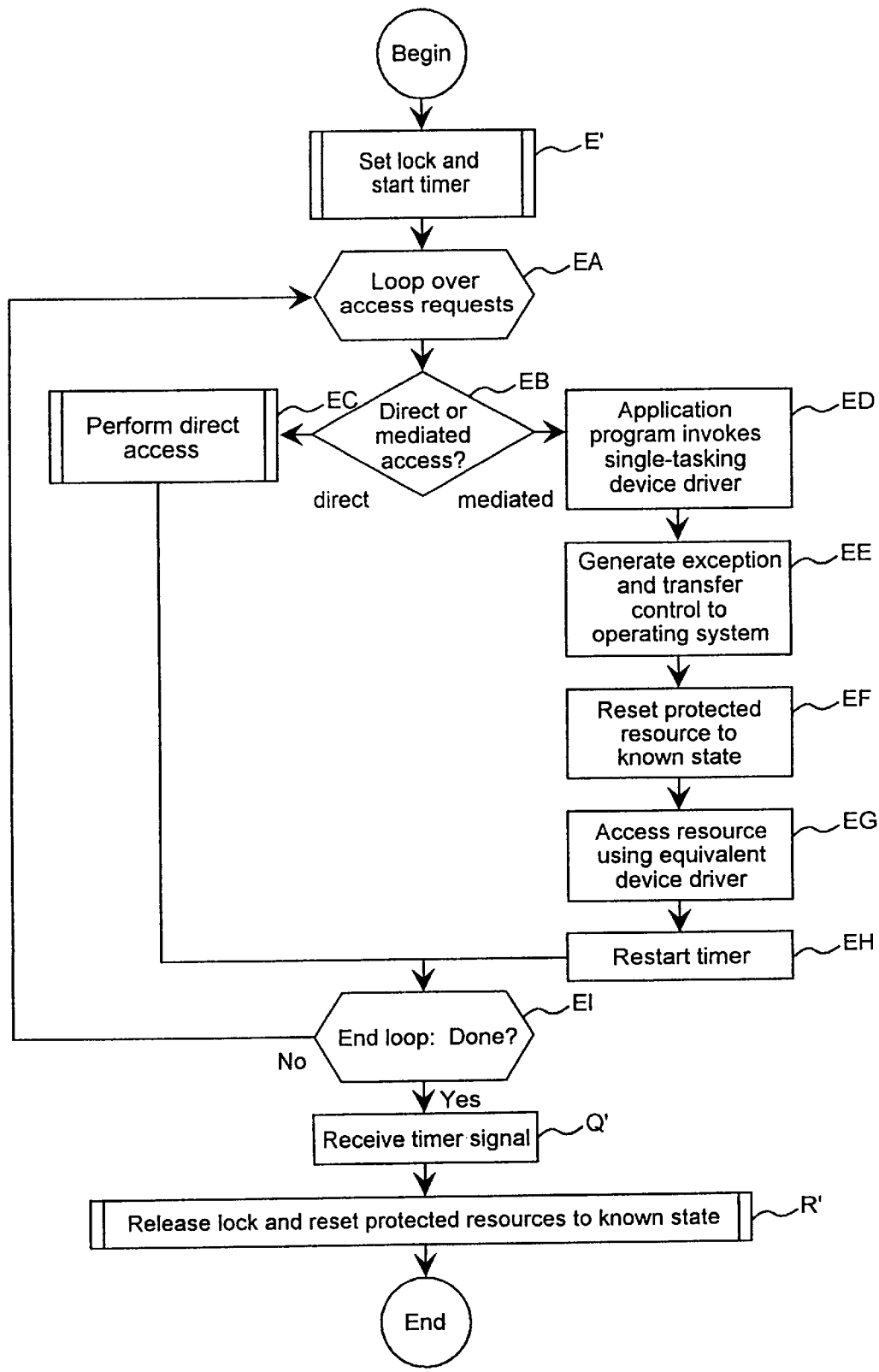
FIG. 8 is a flowchart of steps for alternation between direct and mediated access of the protected resource.

FIG. 8 flowcharts the logic used for an application program 170 that employs hybrid access. At the outset application program 170 is executing as a task in operating system 150. The lock is set and timer 151 is started as previously described with reference to FIG. 6A (step E'). Application program 170 includes a series of requests to access protected resource 140. Some requests of the series are direct access attempts and others are mediated by operating system 150 (step EB). A direct access attempt is processed according to the logic previously described with reference to FIG. 5, in particular steps C through N (step EC). A mediated access request occurs when application program 170 invokes a device driver for its native single-tasking operating system, for example an MS/DOS™ device driver (step ED). This attempt to use the single-tasking device driver generates an exception that causes control to transfer to operating system 150 (step EE). Operating system 150 resets protected resource 140 to a known state by carrying out a full reset, just as is done when releasing the lock; however, the lock remains set (step EF). Operating system 150 performs the requested resource access operation or its equivalent, using its own device drivers (step EG), and restarts timer 151 (step EH). The series of access requests continues until all access requests have been processed (step EI). Thereafter, upon receiving the timer signal (step Q'), the lock is released and the resource reset to a known state as previously described with reference to FIG. 6C (step R').

Besides accommodating application programs designed for the single-tasking environment (application programs of the first kind), the specific embodiment of the invention can accommodate application programs designed for the multi-tasking environment. In particular, the specific embodiment provides support for application programs designed for use with versions of Microsoft® Windows™ that predate Windows™ 95 (application programs of the second kind) as well as application programs written specifically for use with Windows™ 95 (application programs of the third kind).

In particular, backup application programs designed for use with earlier versions of Microsoft® Windows™ can access protected resource 140 by invoking their own custom VXDs, which they, rather than operating system 150, provide. To accommodate these custom backup applications, operating system 150 performs a search for the custom VXDs at system initialization time, at which time the custom VXDs must be loaded into the system. Operating system 150 recognizes the custom VXDs of the most common backup application programs. When operating system 150 recognizes a custom VXD, it substitutes a VXD of its own. The substituted VXD provides the same functionality as the custom VXD, and additionally sets the lock in much the manner described with reference to FIG. 6A above, except that timer 151 is not used and the interrupt reflection mechanism keeps track of which thread in the system virtual machine is executing the application program, so that interrupts can be reflected to that thread. Timer 151 is not needed because an application program designed for Windows explicitly notifies operating system 150 when it is finished with the protected resource. Accordingly, the lock is released when operating system 150 receives such notification. Preferably, only one application program of the second kind runs at a given time, because operating system 150 maintains only one IDT for the system VM.

Backup application programs designed specifically for Windows™ 95 access protected resource 140 using the device driver routines provided by operating system 150. These application programs set the global lock variable by explicitly invoking VFBackup (more precisely, an entry point in VFBackup designed for this purpose). Timer 151 is not used.

Further Embodiments

Two further illustrative examples of embodiments of the invention will now be described. First, the invention can be used to allow an application program to control a protected resource for which the multitasking operating system lacks a device driver, such as a so-called QIC ("quick") tape drive in an operating system that ordinarily does not support such a tape drive. This can accomplished with an application program that takes direct control of the protected resource. The method of the invention is then carried out for this application program similarly to the manner previously described in connection with FIG. 5.

Second, certain copy protection programs used to prevent unauthorized copying of stored data on a floppy disk is designed to bypass the operating systems floppy disk device driver in order to write special copy-protection information on sectors of the floppy disk that are not otherwise used. To achieve the bypass, a copy protection program of this kind invokes a low-level (BIOS) routine stored in a read-only memory component of memory 106. The low-level routine includes a privileged port instruction that accesses the device controller for the floppy disk. The invention can be applied to the copy protection program by treating the low-level routine as an application program that takes direct control of the protected resource, and then applying the method of the invention can be applied similarly to the manner previously described in connection with FIG. 5.

Conclusion

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

I claim:

1. In a computer system comprising a processor, a peripheral device, and a device control mechanism for controlling operations of the peripheral device responsively to commands issued by the processor, a method comprising the steps of:

executing an application program with the processor as a task of a multitasking operating system, the operating system comprising software executable by the processor, the software having a first component for issuing commands to the device control mechanism, the application program having a second component for issuing commands to the device control mechanism, the application program comprising one of a multitask program and a single-task program;

while executing the application program, using the second component of the application program to issue a command directly to the device control mechanism;

generating an exception with the processor;

transferring control to an exception handling routine in the operation system;

determining a status of a lock with the operating system;

responsively to the directly issued command, temporarily bypassing the first component; and controlling an operation of the peripheral device with the device control mechanism.

2. The method of claim 1 and further comprising the step of restoring the first component.

3. The method of claim 2 wherein the step of controlling an operation responsively to the directly issued command leaves the peripheral device in an arbitrary state, and further comprising the step of resetting the peripheral device to a known state.

4. The method of claim 2 wherein the system further comprises a timer, and wherein the restoring step is performed responsively to a signal from the timer.

5. The method of claim 1 and further comprising the steps of:

executing a further task of the operating system contemporaneously with the application program; and while the first component is temporarily bypassed, attempting to engage the device control mechanism from the further task, and with the operating system, preventing the further task from engaging the device control mechanism.

6. The method of claim 1 wherein the first component comprises a first device driver and the second component comprises a second device driver.

7. In a computer system comprising a processor and a peripheral device responsive to commands issued by the processor, a method comprising the steps of:

executing an application program with the processor as a task of a multitasking operating system, the operating system comprising software executable by the processor, the operating system lacking any component for issuing commands to the peripheral device, the application program having a software component for issuing commands to the peripheral device, the application program comprising one of a multitask program and a single-task program;

while executing the application program, using the software component to issue a command to the peripheral device from the processor; and performing an operation with the peripheral device responsively to the issued command.

8. In a computer system comprising a processor, a peripheral device, and a multitasking operating system comprising software executable by the processor for governing a plurality of tasks, the software including a first device driver for the peripheral device, a method comprising the steps of:

executing an application program as a task of the operating system, the application program including a second device driver for the peripheral device;

while executing the application program, issuing a command from the second device driver directly to the peripheral device;

generating an exception with the processor;

transferring control to an exception handling routine in the operation system;

determining a status of a lock with the operating system;

setting the lock to temporarily bypass the first device driver in response to said issuing the command; and while the lock is set, using the second device driver to drive an operation of the peripheral device.

9. The method of clam 8 and further comprising the step of releasing the lock.

10. The method of claim 8 and further comprising the step of:

while the lock is set, preventing access to the peripheral device by a further task of the operating system, the further task executing contemporaneously with the application program.

11. An apparatus comprising:

a processor;

a peripheral device;

a device control mechanism for controlling operations of the peripheral device responsively to commands issued by the processor;

a multitasking operating system, comprising software executable by the processor for governing a plurality of tasks, the multitasking operating system including a first component for issuing commands from the processor to the device control mechanism, the multitasking operating system further including an exception handling routine;

an application program, comprising one of a multitasking software program and single-task software program executable by the processor as a task governed by the operating system, the application program including a second component for issuing commands for the processor to the device control mechanism; and means within said multitasking operating system for temporarily bypassing the first component of said multitasking operating system when the second component of said application program issues a command directly from the processor to the device control mechanism and when said multitasking operating system determines a status of a lock.

12. The apparatus of claim 11 and further comprising means for restoring control of the device control mechanism to the first component.

13. The apparatus of claim 12 and further comprising means for resetting the peripheral device to a known state from an arbitrary state.

14. The apparatus of claim 12 and further comprising:
a timer for measuring an elapsed time, the elapsed time beginning when the timer receives a start signal from the device control mechanism; and
means, coupled to the timer, for activating the restoring means when the measured elapsed time exceeds a threshold value.

15. The apparatus of claim 12 and further comprising:
a memory coupled to the processor;
a memory controller for transferring data between the memory and the peripheral device;
a timer for measuring an elapsed time, the elapsed time beginning when the timer receives a start signal indicating memory controller activity during the application program; and
means, coupled to the timer, for activating the restoring means when the measured elapsed time exceeds a threshold value.

16. The apparatus of claim 12 wherein the peripheral device comprises a storage device.

17. The apparatus of claim 12 wherein the peripheral device comprises a floppy disk drive.

18. The apparatus of claim 12 wherein the peripheral device comprises a QIC tape drive.

19. A method in a computer for executing a multitasking environment an application program that attempts to access a resource directly without requesting access from an operating system, the method comprising:
executing the application program such that, when the application program attempts to access the resource directly, an exception is generated and control is transferred to an exception handling routine in the operating system, the application program comprising one of a multitask program and a single-task program;
upon the application program attempting to access the resource directly, transferring control to the operating system and determining a status of a lock with the operating system;
under control of the operating system,
performing functionality of the access attempted by the application program; and
returning control to the application program wherein subsequent attempts by the application program to access the resource directly will not transfer control to the operating system.

20. The method of claim 19, further including the step of:
upon occurrence of a pre-defined event after returning control to the application program, executing the application program such that when the application program attempts to access the resource directly control is transferred to the operating system.

21. The method of claim 19 wherein the step of returning control includes receiving a request from a second application program to access the resource and denying access to the resource by the second application program.

22. A computer-readable medium containing instructions for controlling a computer system to perform a method, the computer system comprising a processor, a peripheral device, and a device control mechanism for controlling operations of the peripheral device responsively to commands issued by the processor, the method comprising the steps of:
executing an application program with the processor as a task of a multitasking operating system, the operating system comprising software executable by the processor, the software having a first component for issuing commands to the device control mechanism, the application program having a second component for issuing commands to the device control mechanism, the application program comprising one of a multitask program and a single-task program;
generating an exception with the processor;
transferring control to an exception handling routine in the operation system;
determining a status of a lock with the operating system;
while executing the application program, using the second component of the application program to issue a command directly to the device control mechanism;
responsively to the directly issued command, temporarily bypassing the first component; and
controlling an operation of the peripheral device with the device control mechanism.

23. The computer-readable medium of claim 22, further comprising the step of restoring the first component.

24. The computer-readable medium of claim 23 wherein the step of controlling the operation responsively to the issued command leaves the peripheral device in an arbitrary state, and further comprising the step of resetting the peripheral device to a known state.

25. The computer-readable medium of claim 23 wherein the system further comprises a timer, and wherein the restoring step is performed responsively to a signal from the timer.

26. The computer-readable medium of claim 22 and further comprising the steps of:
executing a further task of the operating system contemporaneously with the application program; and
while the first component is temporarily bypassed,
attempting to engage the device control mechanism from the further task; and
with the operating system, preventing the further task from engaging the device control mechanism.

27. The computer-readable medium of claim 22 wherein the first component comprises a first device driver and the second component comprises a second device driver.

28. A computer-readable medium containing instructions for controlling a computer system to perform a method for executing in a multitasking environment an application program that attempts to access a resource directly without requesting access from an operating system, the method comprising:
executing the application such that when the application program attempts to access the resource directly, an exception is generated and control is transferred to an exception handling routine in the operation system, the application program comprising one of a multitask program and a single-task program;
upon the application program attempting to access the resource directly, transferring control to the operating system and determining a status of a lock with the operating system;
under control of the operation system, performing functionality of the access attempted by the application program; and returning control to the application program wherein subsequent attempts by the application program to access the resource directly will not transfer control to the operating system.

* * * * *